June 2, 1936.　　　　S. N. JOHNSON　　　　2,042,716
ASSEMBLING DIE
Filed Jan. 16, 1933　　　2 Sheets-Sheet 1
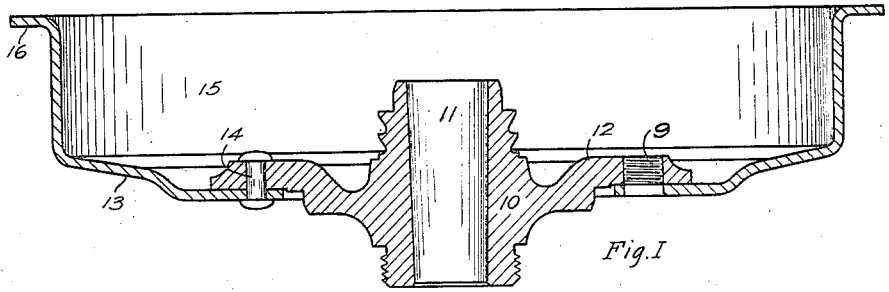
Fig. I
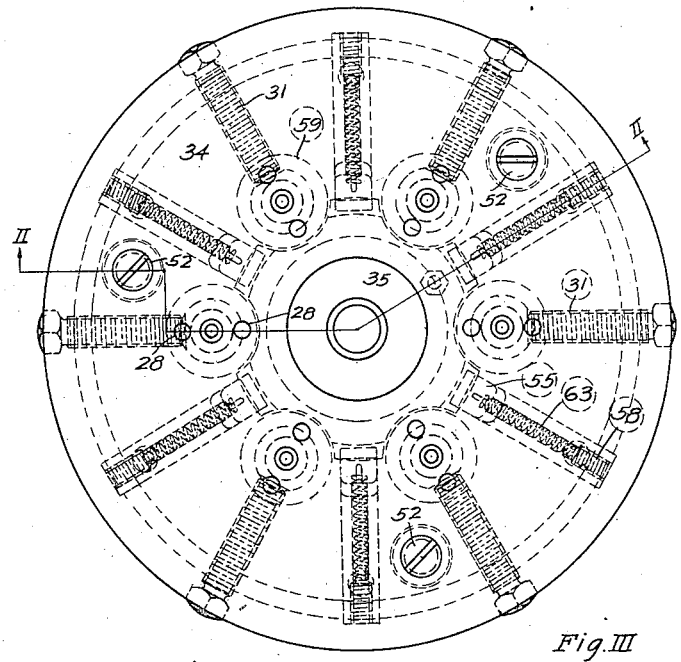
Fig. III
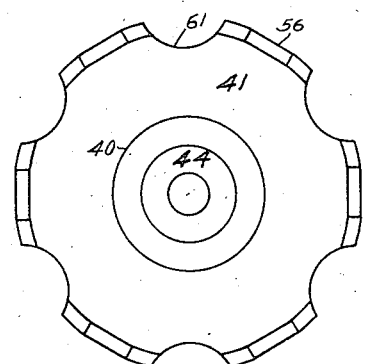
Fig. IV
INVENTOR.
Stanley N. Johnson.
BY Carroll R. Taber
HIS ATTORNEY.

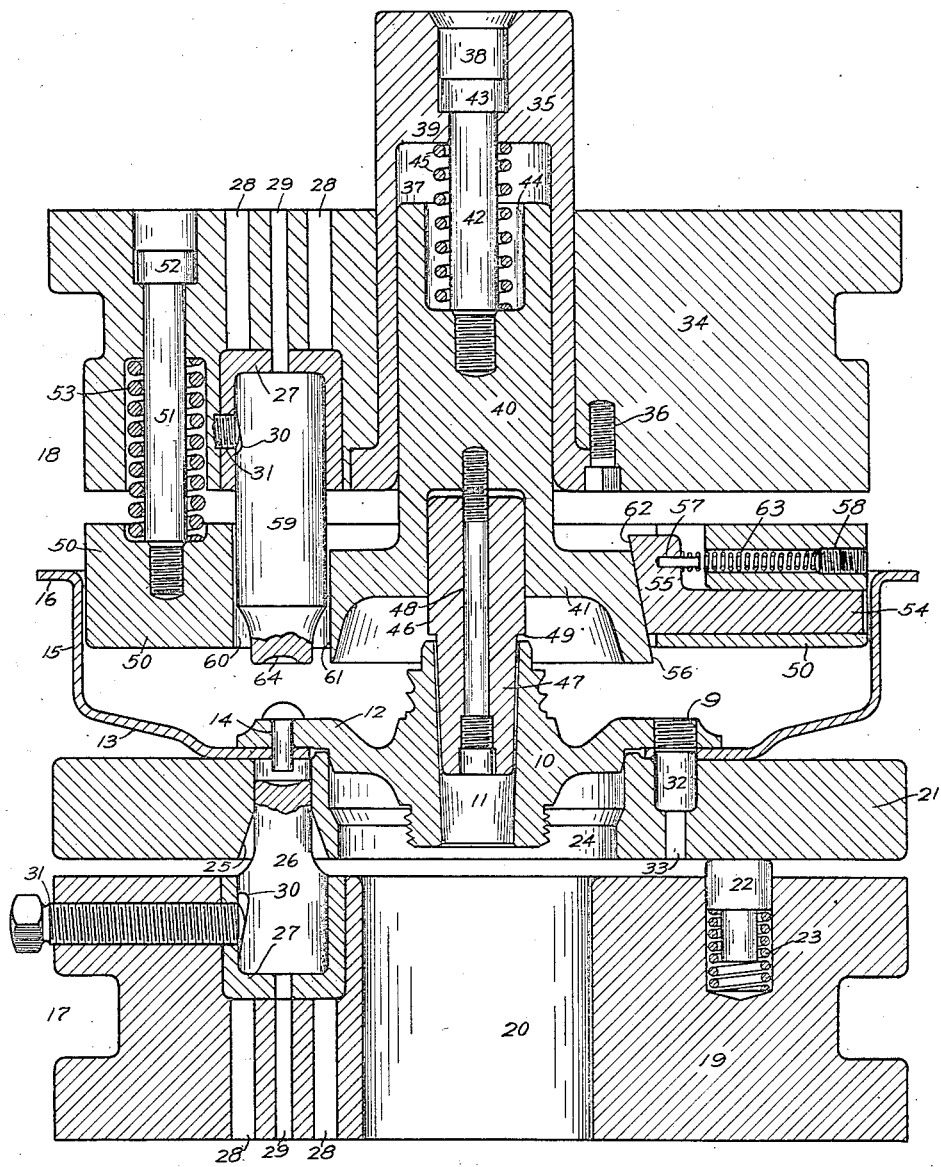
Fig. II

Patented June 2, 1936

2,042,716

UNITED STATES PATENT OFFICE 2,042,716

ASSEMBLING DIE

Stanley N. Johnson, Lansing, Mich., assignor to Motor Wheel Corporation, Lansing, Mich., a corporation of Michigan Application January 16, 1933, Serial No. 651,867

3 Claims. (Cl. 78—49)

This invention relates to assembling dies and more particularly to mechanism of that character adapted to be utilized in fastening a brake drum to a vehicle wheel hub.

In assembling a brake drum with a vehicle wheel hub it is essential that the cylindrical braking surface of the brake drum be in truly concentric relation to the axis of the hub. If the braking surface of the brake drum is even slightly eccentric to the axis of the hub the drum will wear unevenly, become distorted and be generally unsatisfactory.

Prior to the present invention it has been customary to assemble brake drums and hubs in a die provided with suitable hand operated mechanism for positioning these two parts in proper relation to each other and for holding them in that position while they are riveted or otherwise secured together. The manipulation of the various adjusting mechanisms in these prior art assembling dies has made the assembling of apparatus of this character a very slow and relatively expensive process.

The present invention has for its principal object the provision of an assembling die adapted to automatically position the parts to be assembled in the desired relation to each other and to hold them in that position during the fastening operation. Other more specific objects as well as the details of construction of the mechanism embodying the present invention will more fully appear in the following description taken in connection with the accompanying drawings, in which:

Figure I is a cross sectional view of an assembled brake drum and vehicle wheel hub;

Figure II is a cross sectional view of the assembling mechanism embodying the present invention, taken on substantially the line II—II of Figure III;

Figure III is a plan view of the structure shown in Figure II; and

Figure IV is a plan view of the pilot holder and expanding arbor forming a part of the assembling die shown in Figure II.

The vehicle wheel hub and brake drum assembly shown in Figure I consists of a conventional wheel hub 10 provided with a central opening 11 therethrough for the reception of a wheel axle. A conventional form of brake drum 13 is secured to a flange 12 forming a part of the hub 10 by means of the rivets 14. The brake drum 13 is provided with an axially extending cylindrical portion 15 adapted for use as a braking surface. The cylindrical portion 15 may be reinforced by a radially extending flange 16 at its outer extremity.

The hub flange 12 and the adjacent web portion of the brake drum 13 are provided with suitable openings 9 for the reception of conventional stud bolts by means of which a wheel body is attached to the hub. The openings through the hub flange are preferably threaded to receive the threads of the securing bolt.

This particular brake drum and vehicle wheel hub assembly is shown and described for the purpose of illustration only and it should be understood that the mechanism embodying this invention is not limited in its use to operating on this specific construction but is adapted for use in assembling any type of hub and drum as well as various other independent parts.

The assembling die illustrated in Figures II and III includes a stationary part designated generally by the numeral 17 and a movable part designated generally by the numeral 18. The stationary part 17 consists of a stationary bed or shoe 19 which may be secured to a press or other suitable foundation in any desired manner. In its present form the bed 19 is provided with a central opening 20 for a purpose that will appear presently.

A traveling pressure pad 21 is resiliently mounted upon the bed 19 in spaced relation thereto by means of pins 22. These pins are fitted into openings provided in the upper surface of the bed 19 and are preferably supported by the coil springs 23, as shown. Any suitable number of supporting pins and springs may be utilized and the number which are utilized as well as the size and strength of the springs will depend upon the nature of the work to be performed by the pressure pad 21. In the present instance three or more pins are preferred supported by the same number of relatively strong compression springs. The compression springs may, if desired, be dispensed with and any other form of pressure supporting means utilized.

The pressure pad 21 is provided with a central opening 24 therethrough which registers with the opening 20 formed in the bed 19. There is also formed in the pressure pad 21 a plurality of openings 25 into which extend the outer extremities of a plurality of heading punches 26. These heading punches are rigidly connected to the stationary bed 19 and their outer extremities which are formed suitably to head rivets terminate short of the upper surface of the pressure pad 21 when the same is in its extended position, as shown in Figure II.

The stationary bed 19 is provided with suitable sockets 27 for the reception of the inner extremity of the heading punches. These sockets are pressed into openings formed in the upper surface of the stationary bed 19. A pair of passageways 28 extend from the opening into which each of the sockets 27 is disposed to the lower extremity of the bed 19. By inserting suitable tools into these passageways the socket 27 may be readily removed from the bed. A third passageway 29 provides communication between the lower extremity of the stationary bed 19 and the inside of each of the sockets 27 whereby the heading punch 26 supported by such socket may be removed in a similar manner.

Each of the heading punches 26 is provided with a flat tapered surface 30 at one side thereof. An elongated securing bolt 31 threaded into an opening in the side of the stationary bed 19 is adapted to be pressed into engagement with this tapered surface whereby to securely fasten the heading punch within the socket 27.

A plurality of pins 32 are secured to the pressure pad 21 with their outer extremities extending slightly beyond the upper surface of the same. These pins are preferably pressed into openings formed in the upper surface of the pad. An opening 33 provides communication between the lower surface of the pad and the opening into which each of the pins 32 are inserted whereby the pins 32 may be removed by inserting a suitable tool into the opening 33.

The pressure pad 21 is adapted to support the hub 10 and the brake drum 13 during the assembling operation. The hub and drum are preferably loosely assembled by hand as shown in Figure II with the rivets 14 headed at one extremity fitted loosely into registering openings formed in the hub and drum. The unheaded lower extremities of the rivets 14 extend into the openings 25 formed in the pressure pad 21.

The hub and drum are located in a general way on the pad 21 by the pins 32 which are adapted to extend into the openings 9 formed in the hub and drum for the reception of the stud bolts utilized in securing a wheel body to the hub. The main body portion of the hub 10 which is provided with a central opening therethrough extends into the central opening 24 formed in the pressure pad 21. When the pressure pad is depressed as hereinafter described this portion of the hub is projected into the central opening 20 formed in the stationary bed 19.

The movable part of the assembling die, which is designated generally by the numeral 18, consists of a main body or carrier portion 34 rigidly connected to an upwardly extending central tubular member 35 by means of the securing bolts 36. The tubular member 35 is adapted to be secured to any suitable form of plunger, not shown, whereby the carrier 34 and associated parts may be reciprocated vertically. The plunger is adapted to press the parts associated with the carrier 34 into engagement with the hub 10 and drum 13, as will be described presently. The plunger may be operated by any suitable source of power whereby to reciprocate the movable part 18 of the assembling die automatically at predetermined intervals or to reciprocate the same in response to manual operation of a suitable power switch, or the like.

The interior of the tubular member 35 is divided into two passageways 37 and 38 by a partition 39 formed adjacent its upper extremity. The passageway 37 is preferably larger than the passageway 38. A pilot holder 40 provided with an expanding arbor 41 at its lower extremity is slidably mounted within the passageway 37. The pilot holder is removably secured within the passageway 37 by means of an elongated securing bolt 42 having its lower extremity threaded into the pilot holder 40 and its upper extremity extending into the passageway 38. An enlarged head 43 formed at the upper extremity of the bolt 42 is adapted to contact the upper surface of the partition 39 whereby to limit the movement of the pilot holder 40 relative to the tubular member 35.

The upper surface of the pilot holder 40 is preferably provided with a central recess 44. A coil spring 45 is positioned within the recess 44 encircling the securing bolt 42 with its opposite extremities contacting the lower surface of the partition 39 and the bottom of the recess 44. By means of this spring the pilot holder is normally held in an extended position with the head 43 of the bolt 42 contacting the upper surface of the partition 39.

From the foregoing description it will be apparent that the pilot holder 40 and the expanding arbor 41 connected thereto may be reciprocated within the passage 37 subject to the resistance of the coil spring 45 against its upward movement and subject to the limiting effect of the securing bolt head 43 against its downward movement.

A pilot 46 having a tapered lower extremity 47 is secured to the pilot holder 40 by means of the securing bolt 48. The securing bolt 48 is fitted into a central opening extending throughout the length of the pilot 46. It is preferably provided with an enlarged head at its lower extremity and with conventional screw threads adjacent thereto. These threads are adapted to engage similar threads provided at the lower extremity of the central passageway through the pilot 46 whereby to secure the bolt 48 to the pilot. The upper extremity of the bolt 48 extends beyond the upper extremity of the pilot 46 and is threaded to engage corresponding threads formed in an opening in the pilot holder 40.

The tapered portion 47 of the pilot 46 terminates at its upper extremity in a shoulder 49. The taper of the pilot is made to correspond with the taper of the central opening 11 in the hub 10 and when this portion of the pilot is projected into the opening 11, as will be described hereinafter, the shoulder 49 contacts the surface of the hub surrounding the opening 11 therethrough.

While a pilot of the character just described has been found to be most satisfactory for use in assembling a brake drum and wheel hub, it should, of course, be understood that any other suitable means for engaging the hub may be utilized in place thereof. The function of the pilot or corresponding part is, in any event, to locate the hub in the desired position upon the pressure pad 21. The pilot 46 is removably secured to the pilot holder whereby the same may be readily replaced with other forms of pilots to correspond to the various forms of hubs which it may be desired to operate upon.

A plunger supporting member 50 is connected to the carrier 34 by means of securing bolts 51. A central opening is formed in this member through which the expanding arbor 41 extends. The securing bolts 51 are slidably mounted in passageways formed in the carrier 34. The upper extremities of the securing bolts 51 are formed with enlarged heads 52 which are disposed within enlarged extremities of the said passageways. The lower extremities of the securing bolts 51 are threaded into openings in the plunger supporting member 50.

A coil spring 53 of the compression type encircles a portion of each of the securing bolts 51 and has its opposite extremities contacting the carrier 34 and the plunger supporting member 50 respectively. The coil spring 53 is adapted to maintain the plunger supporting member 50 in spaced relation to the carrier 34 as shown in Figure II.

From the foregoing description it will be apparent that the carrier 34 and plunger supporting member 50 are movable relative to each other and relative to the expanding arbor 41. The springs 53 tend to limit the movement of the carrier 34 and the plunger supporting member 50 toward each other and the heads 52 of the securing bolts 51 limit the movement of these parts away from each other.

A plurality of plunger arms 54 are slidably mounted in the plunger supporting member 50 at spaced intervals about the outer circumference thereof. One of the plunger arms is shown in Figure II in its retracted position. Each of the plunger arms 54 is formed with an enlarged base 55, having an inclined outer face 62 adapted to contact an inclined face 56 of the expanding arbor 41.

The plunger arms 54 are each held in their retracted position by means of a coil spring 63 disposed within an opening in the plunger supporting member 50. The coil spring encircles a pin connected to the base 55 of the plunger arms 54. The spring is held in position against the base 55 by a removable cap 58 threaded into the opening formed in the plunger supporting member 50 for the reception of the coil spring 63.

By reason of the cooperative relation between the base 55 of the plunger arms 54 and the inclined faces 56 of the expanding arbor, the plunger arms 54 will be extended longitudinally away from the expanding arbor 41 whenever there is a downward movement of the plunger supporting member 50 relative to the expanding arbor 41. As will be explained presently, the angle of inclination of the face 56 and the face 62 of the plunger arm base 55 is of vital importance in the operation of the assembling die as a whole.

A plurality of holding mandrels 59 are rigidly but removably secured to the carrier 34 by means of securing bolts 31 in exactly the same manner that the heading punches 26 are secured to the stationary bed 19. The lower extremities of the heading punches 59 are formed with seats 64 adapted to engage the heads of rivets 14. That portion of each of the holding mandrels 59 which projects beyond the carrier 34, extends into and through an opening 60 formed in the plunger supporting member 50 and is movable relative thereto. The expanding arbor 41, as best shown in Figure IV, is provided with suitable recesses 61 intermediate its inclined faces 56 to permit the free movement of the holding mandrels 59 without interference from the expanding arbor.

The operation of the assembling die is as follows:

The brake drum 13 and vehicle wheel hub 10 are placed upon the pressure pad 21 when the movable part 18 of the die is in its upper position remote from the pressure pad 21. The rivets 14, preferably with their upper extremities headed, are inserted in the openings provided for that purpose in the hub and drum prior to or at the time these parts are placed upon the pressure pad 21. In placing these parts on the pressure pad the unheaded extremities of the rivets 14 project into the openings 25 formed in the pressure pad 21 above the upper extremities of the heading punches 26. In the present hub and brake drum assembly six rivets are used. There are accordingly six heading punches 26 and six holding mandrels 59. The hub and brake drum are roughly located upon the pressure pad by inserting the pins 32 into the openings 9 formed in the hub and drum.

After the hub and drum have been placed upon the pressure pad as just described the movable part 18 of the die is extended to its operative position, one stage of which is illustrated in Figure II of the drawings. As previously stated, the movable part 18 may be associated with a plunger which is reciprocated automatically at predetermined intervals. It is preferable, however, to actuate the plunger by any suitable hand manipulated control.

As the movable part 18 of the die moves towards the stationary part 17 the tapered portion 47 of the pilot 46 enters the opening 11 in the hub 10 and the plunger supporting member 50 enters the cylindrical portion 15 of the brake drum 13 as shown in Figure II. The pilot 46 serves to locate the hub 10 in a definite position upon the pressure pad 21. The downward movement of the pilot 46 and pilot holder 40 together with the expanding arbor 41 connected thereto is limited by the shoulder 49 of the pilot 46 contacting the hub 10 about the opening 11 therethrough.

By reason of the manner in which the pilot holder 40 is mounted in the tubular member 35 it is possible for the tubular member and the carrier 34 to continue their downward movement after the shoulder 49 of the pilot 46 contacts the hub 10. The continued downward movement of the carrier 34 compresses the coil spring 45 surrounding the securing bolt 42 and positioned between the pilot holder 40 and the partition 39 of the tubular member 35.

After the downward movement of the pilot holder and expanding arbor is interrupted, the plunger supporting member 50 continues its downward movement in unison with the carrying member 34 by reason of the pressure exerted by the compression springs 53. This downward movement of the plunger supporting member 50 relative to the expanding arbor 41 causes the plunger arms 54 to be extended by reason of the contact between the inclined surface 62 of the base 55 thereof and the inclined face 56 of the expanding arbor 41. The angle of inclination of these contacting surfaces is predetermined to a relatively exact degree whereby the plunger arms 54 will be projected uniformly and sufficiently beyond the outer circumference of the plunger supporting member 50 to contact the inner surface of the cylindrical portion 15 of the brake drum 13 and locate the same in truly concentric relation to the axis of the hub 10 which has been previously definitely located by means of the pilot 46.

When the outer extremities of the plunger arms 54 have contacted the inner surface of the cylindrical portion 15 of the brake drum 13, the downward movement of the plunger supporting member 50 is interrupted. The continued downward movement of the carrier member 34 compresses the compression springs 53 encircling the securing bolts 51 and the compression spring 45 encircling the bolt 42. This further downward movement of the carrier also causes the lower extremities of the holding mandrels 59 to contact the heads of the rivets 14 and through this contact to depress the pressure pad 21 against the compression of the springs 23. As the pressure pad 21 is depressed the holding mandrels 59 force the unheaded extremities of the rivets 14 against the heading punches 27 with sufficient pressure to properly flatten the heads whereby to securely fasten the drum 13 to the hub 10. While this heading operation is carried on the drum 13 and hub 10 are firmly held in the desired relation to each other by means of the pilot 46 and the plunger arms 54.

After the rivets have been headed as just described the movable part 18 of the assembling die is, as previously described, either automatically retracted or retracted by means of a manual control. As the plunger connected to the extended tubular portion 35 withdraws the carrier member 34, the compression springs 23 raise the pressure pad 21; the securing bolts 51 by reason of the contact between the heads 52 thereof and the carrying member 34 withdraw the plunger supporting member 50, whereupon the compression springs 63 force the plunger arms 54 to their inoperative position as shown in Figure 11; and the securing bolt 42, by reason of the association between its enlarged head 43 and the partition 39 in the tubular member 35, withdraws the tapered portion 47 of the pilot 46 from the central opening 11 in the hub 10. Thereafter the assembled hub and drum is removed from the pressure pad 21 and the assembling die is in condition to repeat the operation just described.

It should be understood that the specific operation and details of construction of the assembling die herein shown and described may be varied within wide limits without departing from the spirit of the present invention. For example, any suitable form of pilot other than that shown may be used; the rivets 14 may be headed at their lower extremiity only in which event the pressure pad 21 may be stationary at all times; or the rivets may be unheaded at both ends and other suitable means utilized for holding them in position during the heading operation. Many other similar variations and modifications may be made within the scope of the invention as defined by the appended claims.

I claim:

1. An assembling die including in combination a holder for a hub and drum, a carrier movable toward and from said holder, a pilot supported by said carrier and slidable thereon toward and from said holder, an expanding arbor rigidly secured to said pilot and having a cam face disposed within said carrier, and a plunger supported by and within said carrier and movable transversely of said pilot, said plunger having constant operative engagement with the cam face of said expanding arbor.

2. An assembling die including in combination a holder for a hub and drum, a carrier movable toward and from said holder, a pilot supported by said carrier and slidable thereon toward and from said holder for engaging and positioning said hub, an expanding arbor rigidly secured to said pilot and having a cam face disposed within said carrier, said carrier including a plunger supporting plate resiliently supported by said carrier and movable relative to said carrier and said pilot, and a plunger supported by and within said plunger supporting plate and movable transversely of said pilot by engagement with said cam face to position said drum.

3. An assembling die including in combination a holder for parts to be assembled, a carrier movable toward and from said holder, a pilot resiliently supported by said carrier for engaging and positioning one of said parts, an expanding arbor rigidly secured to said pilot and having an inclined face disposed within said carrier, said carrier including a plunger supporting plate resiliently supported by said carrier and movable relative to said carrier and said pilot, a plunger slidably supported by said plunger supporting plate and movable transversely of said pilot to position the other of the parts to be assembled, said plunger engaging the inclined face of said arbor, and stop means on said pilot adapted to limit the movement of said pilot toward the part to be positioned thereby and to compel relative movement between said plunger supporting plate and said expanding arbor upon continued movement of said carrier toward said holder.

STANLEY N. JOHNSON.